US011623506B2

(12) United States Patent
Yabe et al.

(10) Patent No.: US 11,623,506 B2
(45) Date of Patent: Apr. 11, 2023

(54) INTERNAL COMBUSTION ENGINE (71) Applicant: NISSAN MOTOR CO., LTD., Yokohama (JP)

(72) Inventors: Tadashi Yabe, Kanagawa (JP); Masahiro Kudou, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 17/438,541

(22) PCT Filed: Mar. 14, 2019

(86) PCT No.: PCT/JP2019/010475
§ 371 (c)(1),
(2) Date: Sep. 13, 2021

(87) PCT Pub. No.: WO2020/183687
PCT Pub. Date: Sep. 17, 2020

(65) Prior Publication Data
US 2022/0153113 A1    May 19, 2022

(51) Int. Cl.
*B60K 5/12* (2006.01)
*F02B 67/06* (2006.01)
*F02F 7/00* (2006.01)

(52) U.S. Cl.
CPC .............. *B60K 5/12* (2013.01); *F02B 67/06* (2013.01); *F02F 7/0073* (2013.01); *F02F 2007/0075* (2013.01)

(58) Field of Classification Search
CPC . F02F 2007/0075; F02F 7/0073; F02B 67/06; B60K 5/12
See application file for complete search history.

(56) References Cited

FOREIGN PATENT DOCUMENTS

| JP | 7-259578 A | 10/1995 |
|----|------------|---------|
| JP | H1047157 A | * 2/1998 |
| JP | 2010-116020 A | 5/2010 |
| JP | 2017-218920 A | 12/2017 |
| JP | 2018-084172 A | 5/2018 |

* cited by examiner

Primary Examiner — Kevin A Lathers
(74) Attorney, Agent, or Firm — Foley & Lardner LLP

(57) ABSTRACT

A front cover (7) is made of a resin material such as a synthetic resin and is attached to an internal combustion engine body so as to cover the front surface of the internal combustion engine body. The front cover (7) is formed with a mounting part (21) made of a resin material and protruding to the forward side of an internal combustion engine. The mounting part (21) is formed in an elongated hollow shape along the cylinder axial direction of the internal combustion engine. The mounting part (21) is equipped with a vehicle body attachment part (23) for attaching the internal combustion engine to a vehicle body. The vehicle body attachment part (23) is formed integrally with the mounting part (21). It is thereby possible to reduce the weight and number of components of the internal combustion engine.

11 Claims, 9 Drawing Sheets

INTERNAL COMBUSTION ENGINE

TECHNICAL FIELD

The present invention relates to an internal combustion engine.

BACKGROUND TECHNOLOGY

For example, in a patent document 1, the structure is disclosed in which a metal internal-combustion-engine-side mount bracket for attaching an internal combustion engine to a vehicle body is fastened to a metal timing chain cover which covers the front surface of the internal combustion engine.

In the patent document 1, a vehicle-body-side mount bracket fixed to the vehicle body is fastened with the internal-combustion-engine-side mount bracket fixed to the internal combustion engine via the timing chain cover, and the internal combustion engine is attached to the vehicle body.

However, in the patent document 1, the timing chain cover and the internal-combustion-side mount bracket are made as separate parts. In addition, in the patent document 1, the timing chain cover and the internal-combustion-engine-side mount bracket are made from metal parts.

Therefore, in the patent document 1, there is room for further improvement in the reduction of the weight of the internal combustion engine and of the number of the components of the internal combustion engine.

PRIOR ART DOCUMENT

Patent Document

Patent Document 1: Japanese Patent Application Publication 2010-116020

SUMMARY OF THE INVENTION

The internal combustion engine of the present invention includes a front cover made of a resin which is disposed so as to cover end surfaces on one end sides of a cylinder block and a cylinder head in a crankshaft axial direction. A mounting part made of a resin material and provided for attaching the internal combustion engine to a vehicle body is formed integrally with the front cover.

According to the present invention, since the resin mounting part for mounting the internal combustion engine on the vehicle body is formed integrally with the resin front cover, as compared with a case where a mount bracket made of iron formed separately from a front cover is used, the reduction of the weight and the number of the components of the internal combustion engine can be achieved.

MODE FOR IMPLEMENTING THE INVENTION

In the following, an embodiment of the present invention will be explained in detail based on the drawings. In addition, the X-axis in each of the drawings represents the front and back direction (crankshaft axial direction) of an internal combustion engine 1, the Y-axis in each of the drawings represents the right and left direction (width direction) of internal combustion engine 1, and the Z-axis in each of the drawings represents the up and down direction (cylinder axial direction) of internal combustion engine 1.

Figure 1:
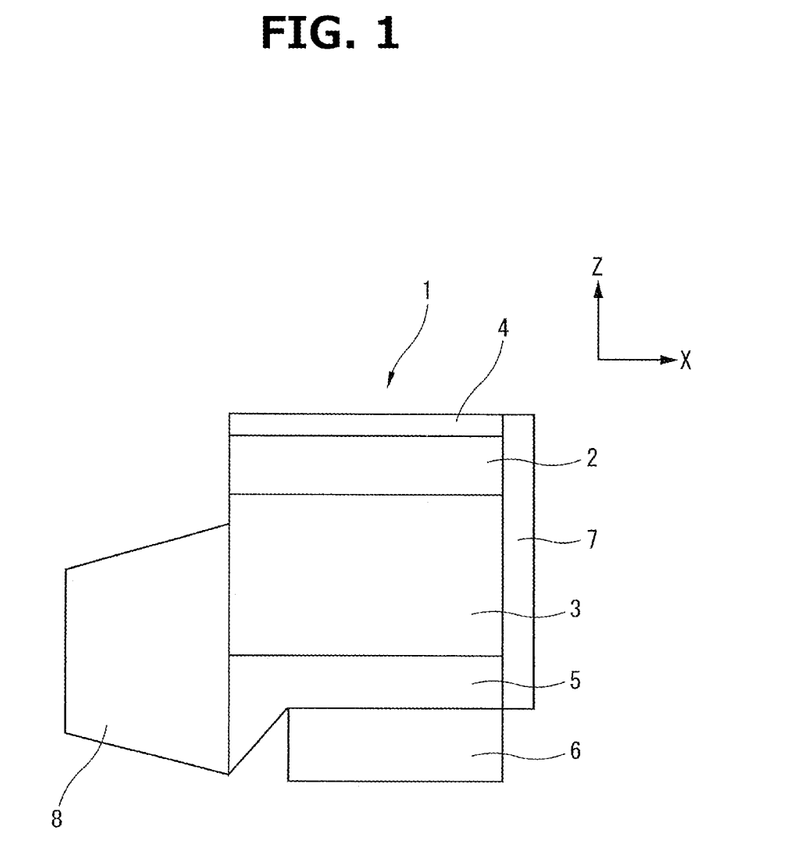
FIG. 1 is an explanatory view schematically showing the configuration of an internal combustion engine to which the present invention is applied.

FIG. 1 is an explanatory drawing schematically showing the configuration of internal combustion engine 1 to which the present invention is applied.

Internal combustion engine 1 is mainly composed of a cylinder head 2, a cylinder block 3 attached to the lower part of cylinder head 2, an integrated cam bracket 4 attached to the upper part of cylinder head 2, an oil pan upper 5 attached to the lower part of cylinder block 3, an oil pan lower 6 attached to the lower part of oil pan upper 5, and a front cover 7 which covers the front surface of internal combustion engine 1. Internal combustion engine 1 is, as a driving source, mounted on a vehicle such as an automobile. In addition, the numeral "8" in FIG. 1 represents a transmission connected to the back end of internal combustion engine 1.

Cylinder head 2 is a casting made of metal material, such as aluminum alloy, and is formed with an intake port (not shown) for supplying intake air to a combustion chamber (not shown) and an exhaust port (not shown) for discharging exhaust gas from the combustion chamber (not shown).

Cylinder block 3 is a casting made of metal material, such as aluminum alloy, and is formed with cylinders (not shown) according to the number of cylinders.

Oil pan upper 5 is made of metal material, such as aluminum alloy, and forms, together with cylinder block 3, a crank case (not shown) in which a crankshaft (not shown) is accommodated.

Oil pan lower 6 is made of a resin material, such as a synthetic resin, and stores oil for lubrication.

Integrated cam bracket 4 is made of metal material, such as aluminum alloy, and rotatably supports, together with cylinder head 2, two cam shafts (not shown).

Figure 2:
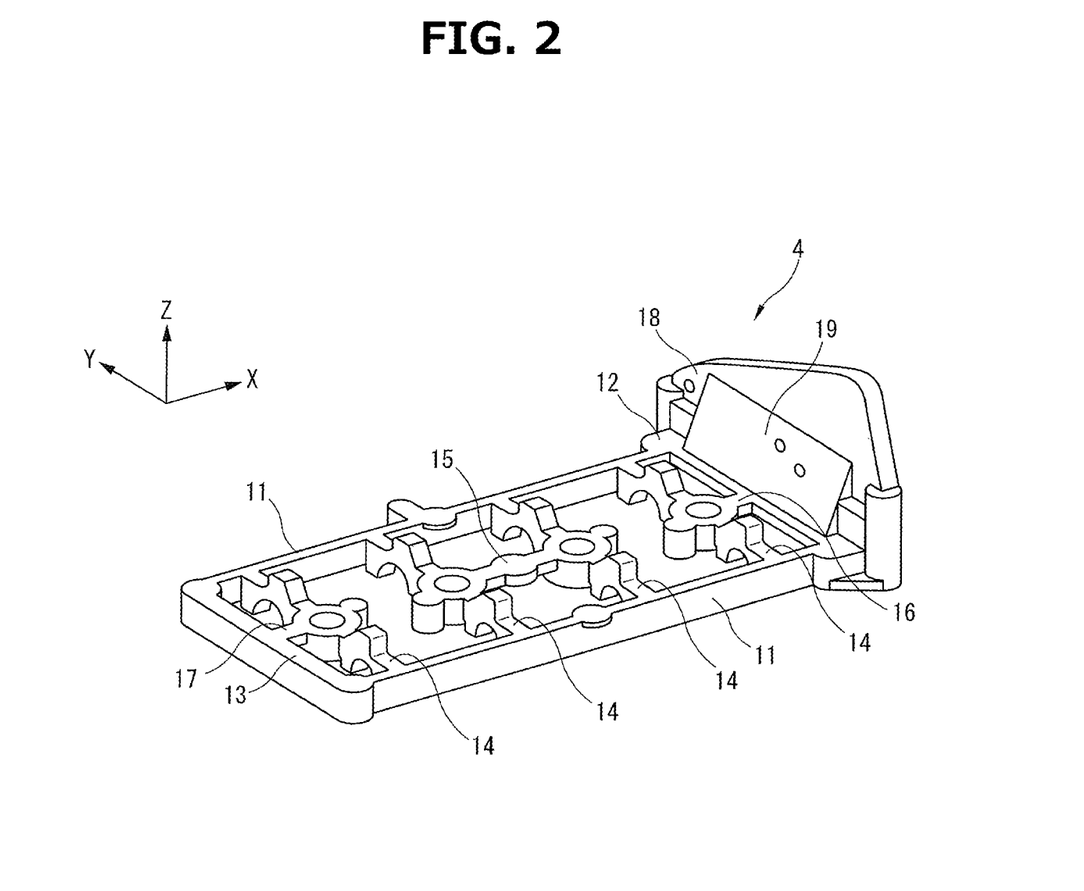
FIG. 2 is a perspective view of an integrated cam bracket.

FIG. 2 is a perspective view of integrated cam bracket 4. Integrated cam bracket 4 shown in FIG. 2 is applied in a case where internal combustion engine 1 has four cylinders.

Integrated cam bracket 4 includes two side frames 11 and 11, a front frame 12 having a rectangular plate shape which connects the front ends of both side frames 11 and 11 to each other, a rear frame 13 which connects the rear ends of both side frames 11 and 11 to each other, a plurality of bearing beams 14, a center bean 15 in the center, sub-center beams 16 and 17 on the both sides, and a one-end-side wall 18 protruding upward from front frame 12.

Each of bearing beams 14 rotatably holds the two cam shafts, together with bearing holders (not shown) formed to cylinder head 2.

For example, bearing beams 14 are disposed so as to across the respective middles of the cylinders.

Center beam 15 extends along the direction of a cylinder bank (crankshaft axial direction) so as to be laid over between two bearing beams 14 in the middle.

Sub-center beam 16 extends along the direction of the cylinder bank (crankshaft axial direction) so as to be laid over between front frame 12 and a bearing beam 14 adjacent to front frame 12.

Sub-center beam 17 extends along the direction of the cylinder bank (crankshaft axial direction) so as to be laid over between rear frame 13 and a bearing beam 14 adjacent to rear frame 13.

One-end-side wall 18 is positioned on one end side of integrated cam bracket 4 in the crankshaft axial direction. That is, one-end-side wall 18 is positioned on the front surface of internal combustion engine 1 so as to face front cover 7.

One-end-side wall 18 includes, on the back side thereof, a protruding portion 19 having a wedge shape in cross section.

Protruding portion 19 is formed such that the thickness of protruding portion 19 gradually increases toward the cylinder head side in the cylinder axial direction of internal combustion engine 1. Specifically, the surface of protruding portion 19 is inclined such that the thickness of protruding portion 19 gradually increases toward the cylinder head side in the cylinder axial direction of internal combustion engine 1.

The upper surface opening of integrated cam bracket 4 is covered with a cylinder head cover (not shown) made from, for example, a synthetic resin molding. With this, the sealed state of a valve chamber in which cam shafts and the like are accommodated is ensured.

Front cover 7 is made of a resin material such as a synthetic resin, and is attached to an internal combustion engine body so as to cover the front surface of the internal combustion engine body. Specifically, front cover 7 is attached to the front surface of cylinder block 3, the front surface of cylinder head 2, the front surface of integrated cam bracket 4 and the front surface of oil pan upper 5 by bolts not shown in the drawings. In other words, front cover 7 is disposed so as to cover the end surfaces on one end sides of cylinder block 3 and cylinder head 2 in the crankshaft axial direction.

Font cover 7 accommodates the crank sprocket (not shown) fixed to the front end of the crankshaft (not shown) and the cam sprockets (not shown) fixed to the front ends of the cam shafts (not shown) in the space formed with the front surface of the internal combustion engine body. A timing chain (not shown) for transmitting rotation power is wound around these crank sprocket and cam sprockets.

As shown in FIG. 3 to FIG. 8, front cover 7 includes a mounting part 21 protruding to the forward side of internal combustion engine 1. Here, the forward side of internal combustion engine 1 in the present specification corresponds to the right side in FIG. 1, the front side in the vertical direction on the paper surface of FIG. 3, and the left side in FIG. 7.

Figure 3:
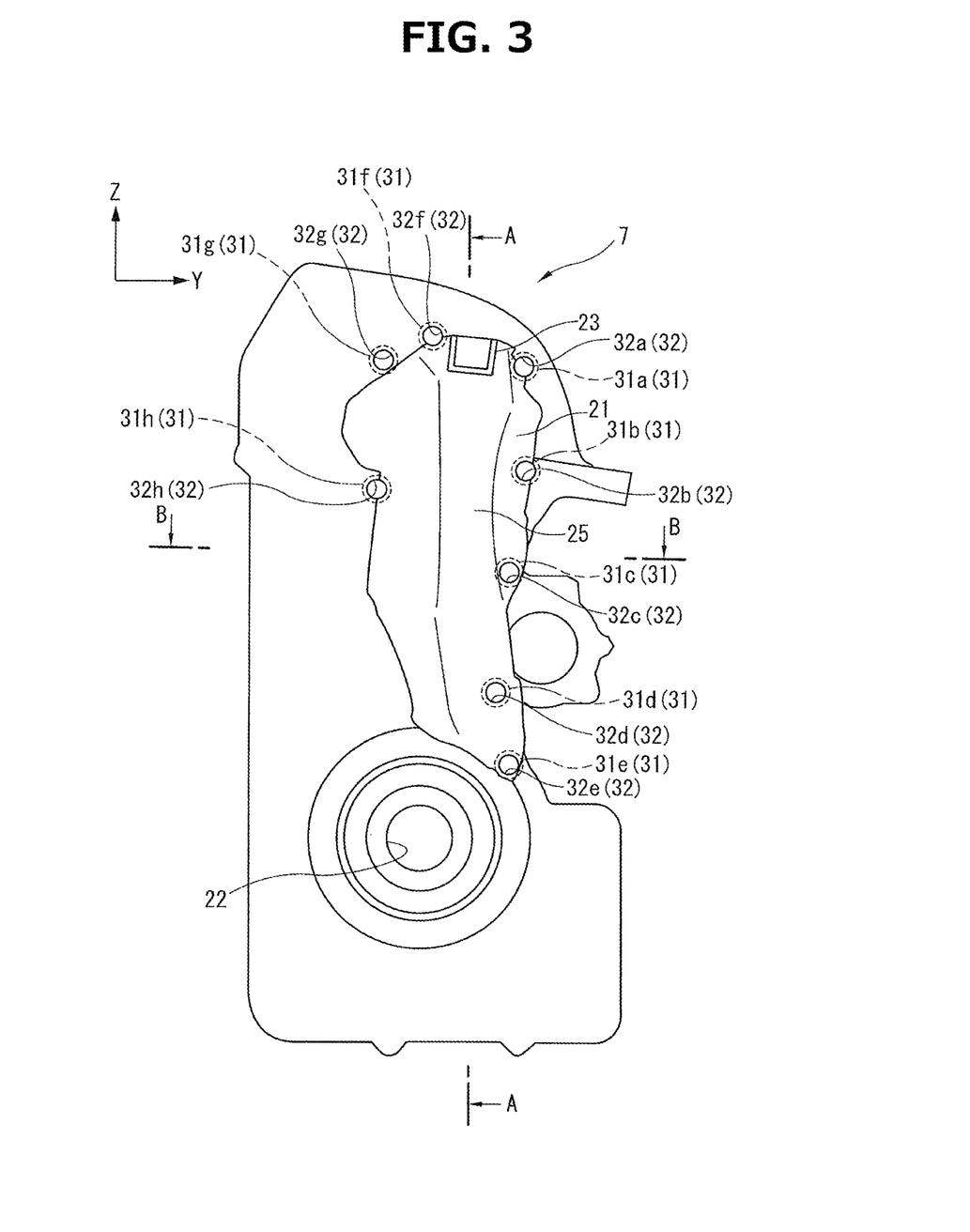
FIG. 3 is a front view of a front cover.
Figure 4:
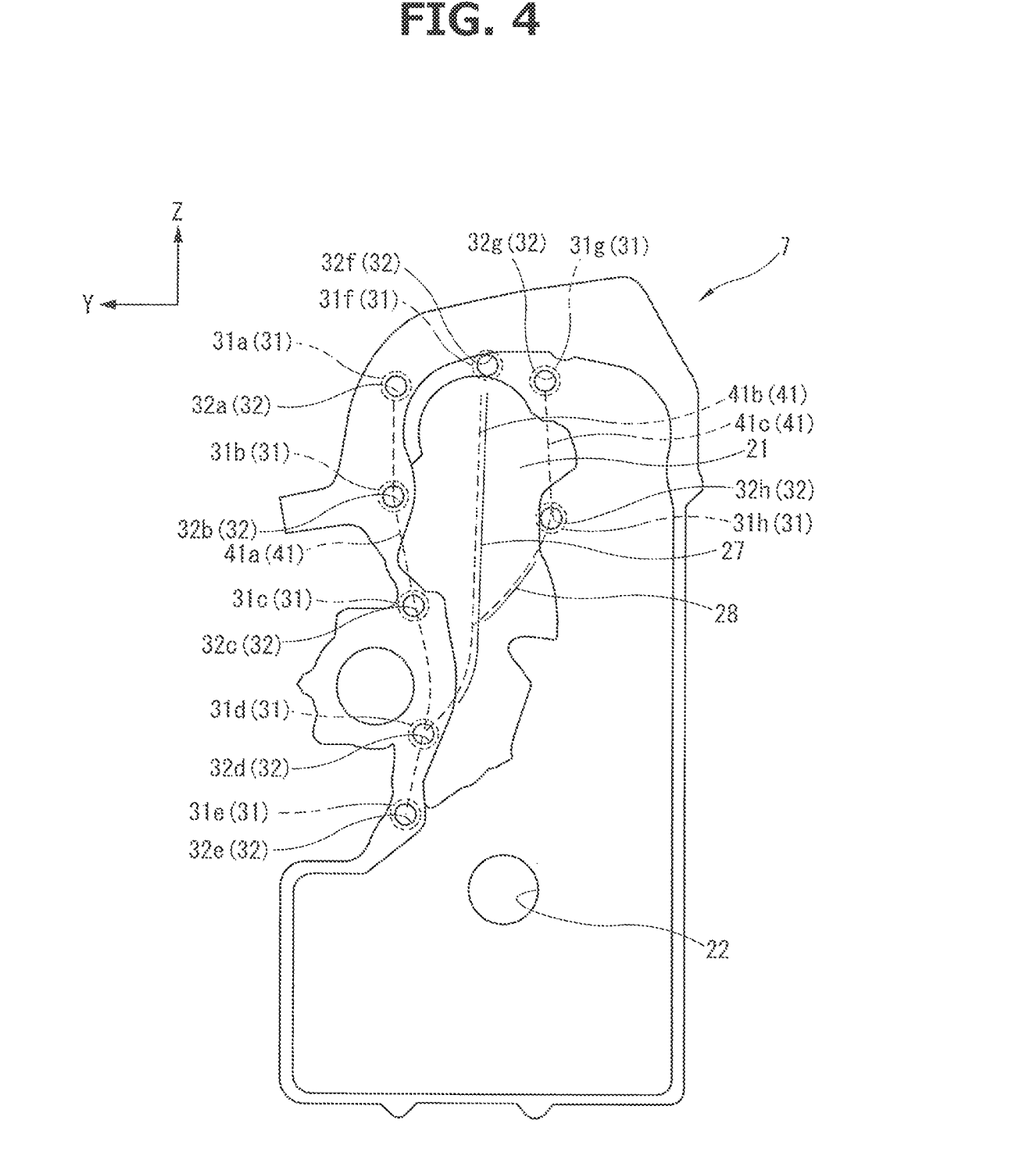
FIG. 4 is a back view of the front cover.
Figure 5:
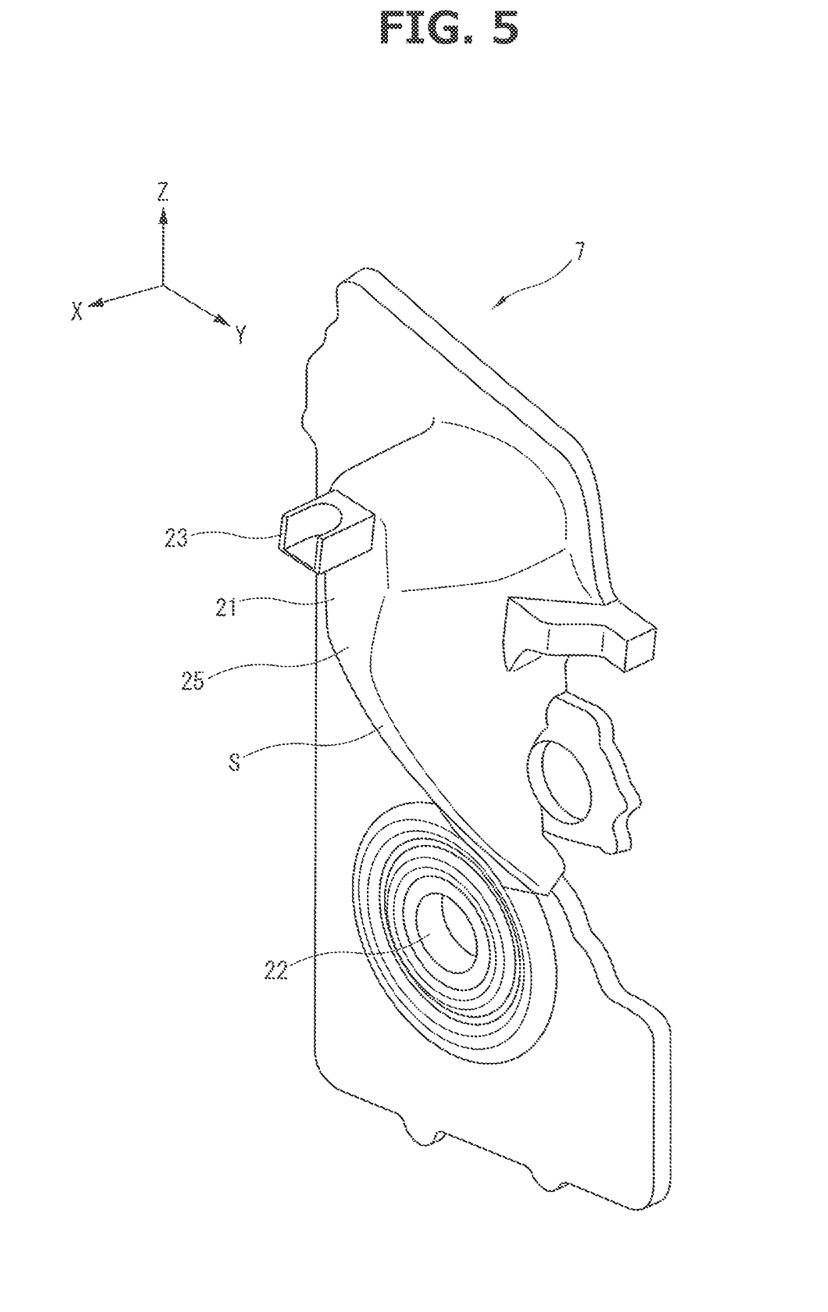
FIG. 5 is a perspective view of the front cover.
Figure 6:
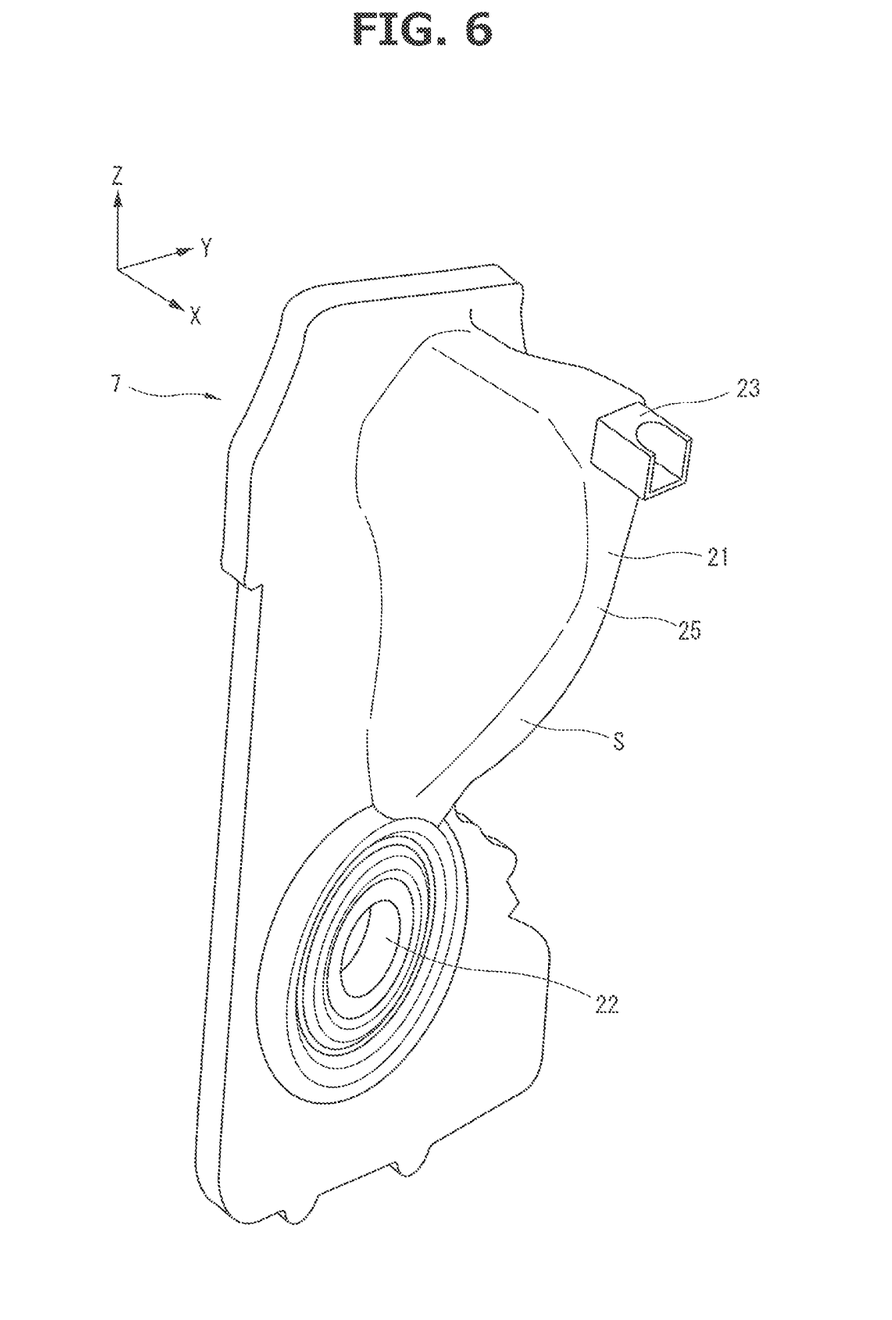
FIG. 6 is a perspective view of the front cover.
Figure 7:
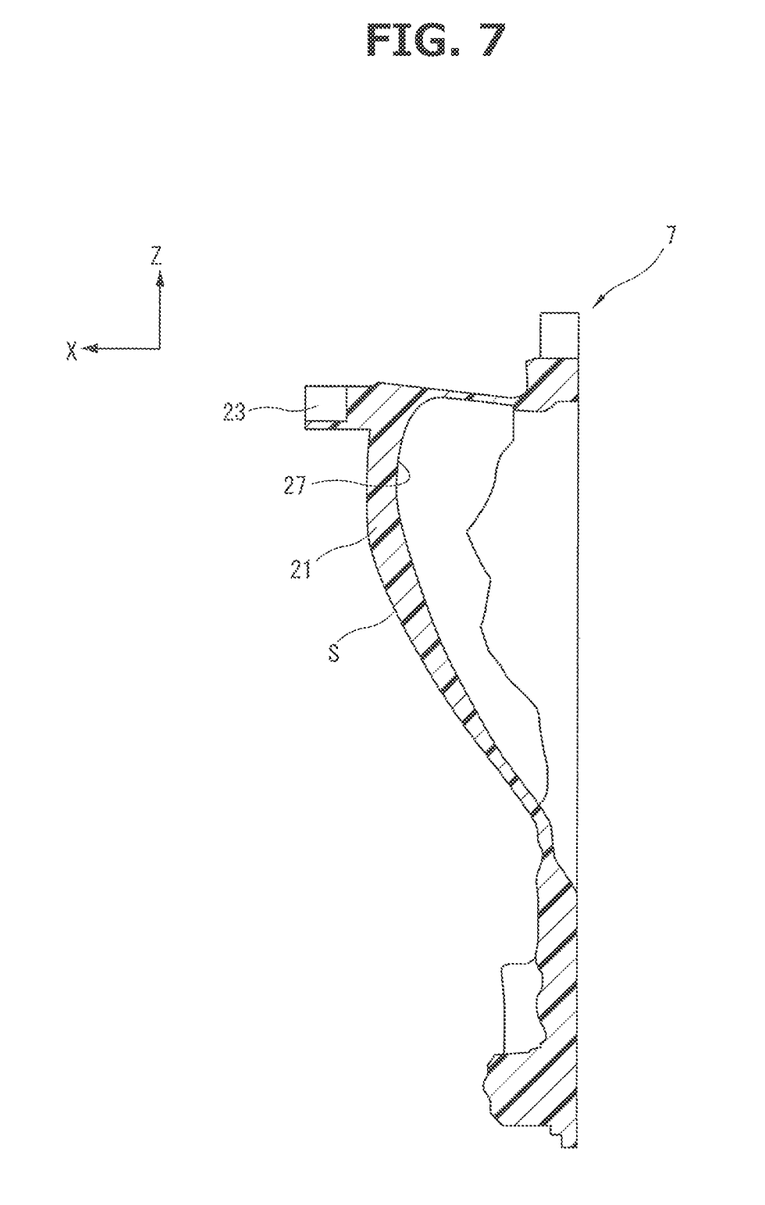
FIG. 7 is a sectional view along an A-A line of FIG. 3.
Figure 8:
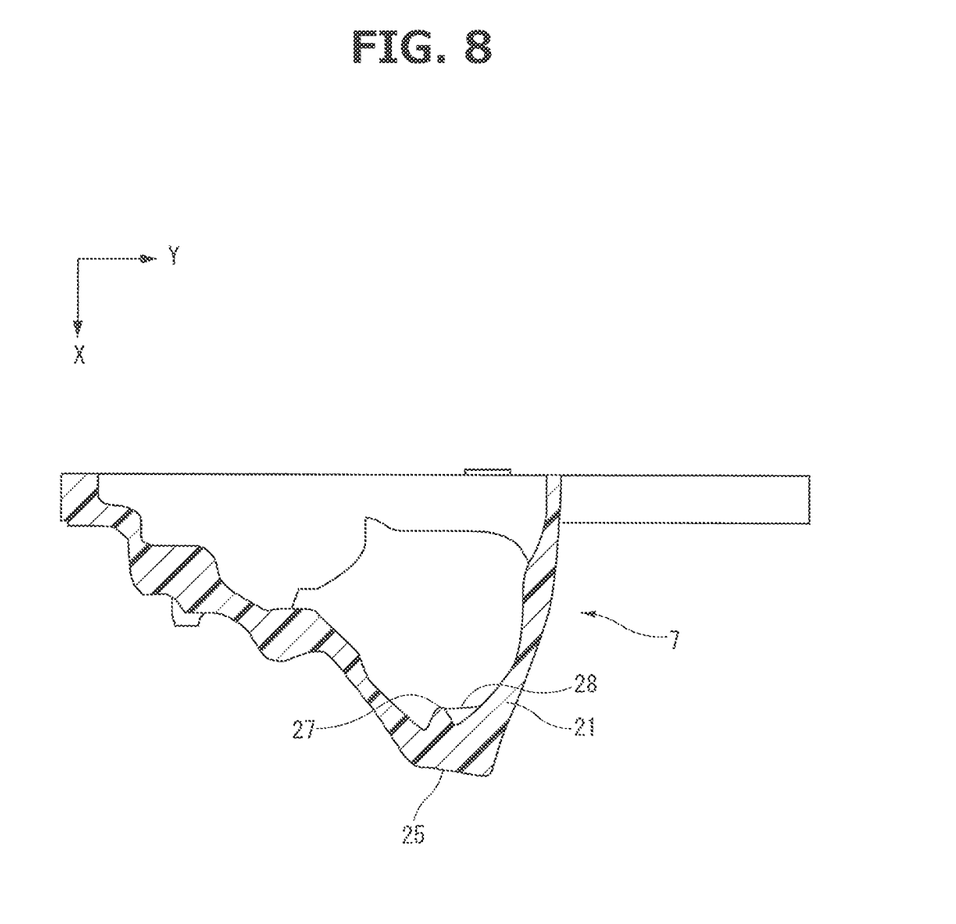
FIG. 8 is a sectional view along a B-B line of FIG. 3.

FIG. 3 is a front view of front cover 7. FIG. 4 is a back view of front cover 7. Each of FIG. 5 and FIG. 6 is a perspective view of front cover 7. FIG. 7 is a sectional view along an A-A line of FIG. 3. FIG. 8 is a sectional view along a B-B line of FIG. 3. In addition, the numeral "22" in FIG. 3 to FIG. 8 represents a crankshaft hole through which the crankshaft (not shown) passes to internal combustion engine 1.

Mounting part 21 includes a vehicle body attachment part 23 for attaching internal combustion engine 1 to a vehicle body (not shown) on which internal combustion engine 1 is mounted. As shown in FIG. 3 and FIG. 5 to FIG. 7, vehicle body attachment part 23 is formed integrally with mounting part 21. Vehicle body attachment part 23 is fixed to the vehicle body side on which internal combustion engine 1 is mounted.

As shown in FIG. 3 to FIG. 8, mounting part 21 protrudes to the forward side of internal combustion engine 1, and is formed in an elongated hollow shape along the cylinder axial direction of internal combustion engine 1. That is, mounting part 21 is formed such that the length of mounting part 21 along the cylinder axial direction of internal combustion engine 1 is longer than the length of mounting part 21 along the width direction of internal combustion engine 1 when viewed in the crankshaft axial direction.

In addition, as shown in FIG. 3, mounting part 21 is formed such that the length of mounting part 21 along the cylinder axial direction of internal combustion engine 1 is longer than the length of mounting part 21 along the width direction of internal combustion engine 1 when viewed in the crankshaft axial direction. Here, the cylinder axial direction of internal combustion engine 1 corresponds to the up and down direction in FIG. 3. In addition, the width direction of internal combustion engine 1 when viewed in the crankshaft axial direction corresponds to the right and left direction in FIG. 3.

As shown in FIG. 3, and FIG. 5 to FIG. 7, vehicle body attachment part 23 is formed on the cylinder head side of mounting part 21 in the cylinder axial direction of internal combustion engine 1. In other words, vehicle body attachment part 23 is formed at the upper part of mounting part 21 in the cylinder axial direction of internal combustion engine 1.

As shown in FIG. 5 to FIG. 7, mounting part 21 is formed such that the outer shape (outer shape 5) from vehicle body attachment part 23 to the lower end of mounting part 21 along the longitudinal direction of mounting part 21 is gently continued without forming steps.

Specifically, mounting part 21 is formed such that the outer shape (outer shape 5) of mounting part 21 from vehicle body attachment part 23 to the lower end of mounting part 21 along the cylinder axial direction of internal combustion engine 1 is gently continued at a predetermined curvature (for example, 0.5) so as to protrude outward.

In other words, mounting part 21 is formed such that the outer shape (outer shape 5), along the longitudinal direction of mounting part 21, from vehicle body attachment part 23 to the lower end of mounting part 21 positioned more on the crankshaft side of internal combustion engine 1 than vehicle body attachment part 23 in the cylinder axial direction of internal combustion engine 1 is gently continued in a curved shape at a predetermined curvature (for example, 0.5) so as to protrude outward.

As shown in FIG. 5 to FIG. 7, mounting part 21 is formed such that the cross section change rate of mounting part 21 becomes small as it goes from vehicle body attachment part 23 to the lower end of mounting part 21.

In other words, mounting part 21 is formed such that the cross section change rate of mounting part 21 becomes small as it goes from vehicle body attachment part 23 to the lower end of mounting part 21 positioned more on the crankshaft side of internal combustion engine 1 than vehicle body attachment part 23 in the cylinder axial direction of internal combustion engine 1.

As shown in FIG. 3 and FIG. 5 to FIG. 7, mounting part 21 is formed such that the upper end side (upper part side) at which vehicle body attachment part 23 is provided protrudes to the forward side of internal combustion engine 1 more than the lower end side (lower part side).

As shown in FIG. 5 to FIG. 7, mounting part 21 is formed such that the protrusion amount of the upper end part (upper part), at which vehicle body attachment part 23 is provided, to the forward side of internal combustion engine 1 becomes substantially constant.

In addition, as shown in FIG. 5 to FIG. 7, mounting part 21 is formed such that the protrusion amount of mounting part 21 protruding to the forward side of internal combustion engine 1 is smaller as it goes toward the lower end side (lower part side).

As shown in FIG. 3, FIG. 5, FIG. 6 and FIG. 8, mounting part 21 is formed such that the protrusion amount of a middle portion 25 in the width direction of internal combustion engine 1 which protrudes toward the vehicle front side is relatively large. That is, as shown in FIG. 3, FIG. 5, FIG. 6 and FIG. 8, mounting part 21 is formed such that the protrusion amount of middle portion 25 in the width direction of internal combustion engine 1 which protrudes toward the vehicle front side is larger than that on the both sides of mounting part 21 in the width direction of internal combustion engine 1 which protrudes toward the vehicle front side.

As shown in FIG. 4, FIG. 7 and FIG. 8, mounting part 21 is formed with, on the back side thereof, a vertical rib 27 such that the thickness of middle portion 25 becomes thick. In addition, as shown in FIG. 4 and FIG. 8, mounting part 21 is formed with, on the back side thereof, a lateral rib 28. In the lower part of the after-mentioned boss portion 31h, lateral rib 28 is formed so as to connect vertical rib 27 and the outer peripheral edge of mounting part 21 on the side of internal combustion engine 1 where auxiliary machines are not attached. Mounting part 21 is formed such that the thickness at the forming position of lateral rib 28 is relatively thick.

As shown in FIG. 3 and FIG. 4, front cover 7 includes a plurality of boss portion 31 (eight boss portions 31 in the present embodiment) to be fixed to internal combustion engine 1, in the outer peripheral edge of mounting portion 21. A through hole 32 into which a bolt (not shown) for fixing the outer peripheral edge of mounting part 21 to the internal engine body is inserted is formed to the center of each of boss portions 31.

The numerals "31a" to "31h" in FIG. 3 and FIG. 4 represent boss portions provided to the outer peripheral edge of mounting part 21. The numerals "32a" to "32h" in FIG. 3 and FIG. 4 represent though holes provided to respective boss portions 31.

In addition, in addition to through holes 32, through holes not shown in the drawings are formed to the outer peripheral edge of front cover 7. Bolts (not shown) for fixing front cover 7 to internal combustion engine 1 are inserted into these respective through holes not shown in the drawings.

Boss portions 31 are fixed to holding points 33 provided on the internal combustion engine body side. These holding points 33 are screw holes provided on the internal combustion engine body side, and bolts (not shown) for fixing the outer peripheral edge of mounting part 21 of front cover 7 to internal combustion engine 1 are inserted.

In addition, mounting part 21, vehicle body attachment part 23, vertical rib 27, lateral rib 28 and boss portions 31 are made from a resin material such as a synthetic resin.

Figure 9:
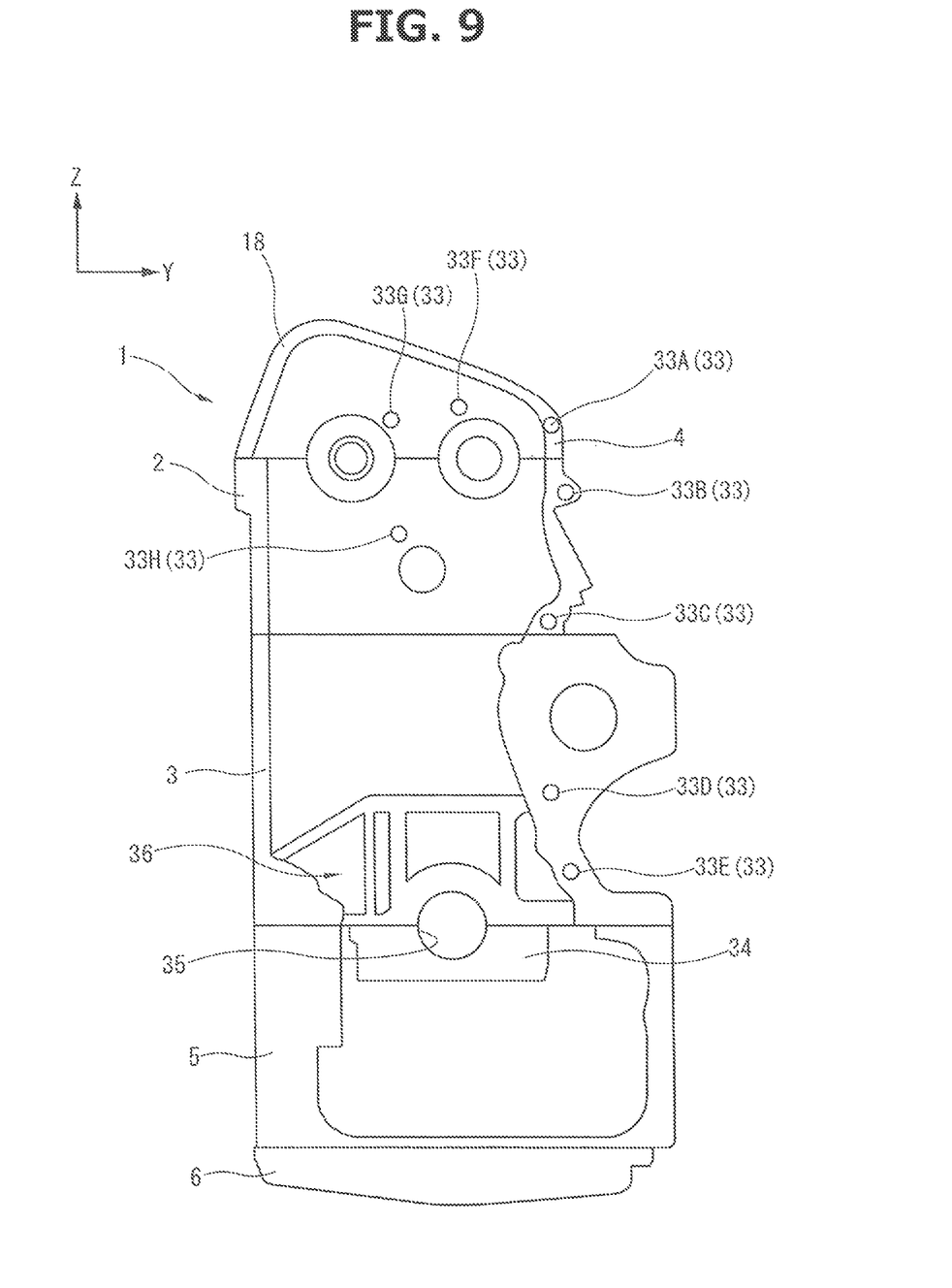
FIG. 9 is an explanatory view schematically showing the front surface of the internal combustion engine in a state in which the front cover is detached.

FIG. 9 is an explanatory view schematically showing the front surface of the internal combustion engine in a state in which front cover 7 is detached. The numerals "33A" to "33H" in FIG. 9 represent holding points for boss portions 31a to 31h of front cover 7. In addition, the numeral "34" in FIG. 9 represents a ladder frame. Ladder frame 34 is made of metal material such as aluminum alloy, and is attached to the lower part of cylinder block 3 with a plurality of bolts (not shown). Ladder frame 34 forms, with cylinder block 3, a plurality of main bearing portions 35 for rotatably supporting the crankshaft (not shown). That is, the crankshaft is rotatably supported between the lower surface of cylinder block 3 and the upper surface of ladder frame 34.

Boss portion 31a is fixed to holding point 33A provided to one-end-side wall 18 of integrated cam bracket 4. That is, one-end-side wall 18 of integrated cam bracket 4 includes holding point 33A for fixing boss portion 31a. One-end-side wall 18 provided with holding point 33A includes, on the back side thereof, protruding portion 19, and the rigid of one-end-side wall 18 is high. Consequently, in front cover 7, when boss portion 31a is fixed to holding point 33A, the rigid of mounting part 21 can be improved.

Boss portion 31b is fixed to holding point 33B provided to cylinder head 2. Holding point 33B is provided on the side of internal combustion engine 1 where auxiliary machines are attached, when viewed in the crankshaft axial direction. That is, when viewed in the crankshaft axial direction, cylinder head 2 includes, on the side of internal combustion engine 1 where auxiliary machines (not shown) are attached, holding point 33B for fixing boss portion 31b. The rigid of cylinder head 2 on the side of internal combustion engine 1 where the auxiliary machines (not shown) are attached is high. Consequently, in front cover 7, when boss portion 31b is fixed to holding point 33B, the rigid of mounting part 21 can be improved.

Boss portion 31c is fixed to holding point 33C provided to cylinder head 2. When viewed in the crankshaft axial direction, holding point 33C is provided on the side of internal combustion engine 1 where auxiliary machines are attached. That is, when viewed in the crankshaft axial direction, cylinder head 2 includes, on the side of internal combustion engine 1 where auxiliary machines (not shown) are attached, holding point 33C for fixing boss portion 31c. The rigid of cylinder head 2 on the side of internal combustion engine 1 where auxiliary machines (not shown) are attached is high. Consequently, in front cover 7, when boss portion 31c is fixed to holding point 33C, the rigid of mounting part 21 can be improved.

Boss portion 31d is fixed to holding point 33D provided to cylinder block 3. Holding point 33D is provided on the side of internal combustion engine 1 where auxiliary machines are attached, when viewed in the crankshaft axial direction. That is, when viewed in the crankshaft axial direction, cylinder block 3 includes, on the side of internal combustion engine 1 where auxiliary machines (not shown) are attached, holding point 33D for fixing boss portion 31d. The rigid of cylinder block 3 on the side of internal combustion engine 1 where auxiliary machines (not shown) are attached is high. Consequently, in front cover 7, when boss portion 31d is fixed to holding point 33D, the rigid of mounting part 21 can be improved.

Boss portion 31e is fixed to holding point 33E provided to cylinder block 3. Holding point 33E is provided on the side of internal combustion engine 1 where auxiliary machines are attached, when viewed in the crankshaft axial direction. That is, when viewed in the crankshaft axial direction, cylinder block 3 includes, on the side of internal combustion engine 1 where auxiliary machines (not shown) are attached, holding point 33E for fixing boss portion 31e. Holding point 33E is provided to a crankshaft supporting part 36 of cylinder block 3 which supports the crankshaft (not shown) of internal combustion engine 1. The rigid of cylinder block 3 on the side of internal combustion engine 1 where auxiliary machines (not shown) are attached is high. In addition, the rigid of crankshaft supporting part 36 of cylinder block 3 is high in order to support the crankshaft (not shown). Consequently, in front cover 7, when boss portion 31e is fixed to holding point 33E, the rigid of mounting part 21 can be improved.

Boss portion 31f is fixed to holding point 33F provided to one-end-side wall 18 of integrated cam bracket 4. That is, one-end-side wall 18 of integrated cam bracket 4 includes holding point 33F for fixing boss portion 31f. One-end-side wall 18 provided with holding point 33F includes, on the back side thereof, protruding portion 19, and the rigid is high. Consequently, in front cover 7, when boss portion 31f is fixed to holding point 33F, the rigid of mounting part 21 can be improved.

Boss portion 31g is fixed to holding point 33G provided to one-end-side wall 18 of integrated cam bracket 4. That is, one-end-side wall 18 of integrated cam bracket 4 includes holding point 33G for fixing boss portion 31g. One-end-side wall 18 provided with holding point 33G includes, on the back side thereof, protruding portion 19, and the rigid is high. Consequently, in front cover 7, when boss portion 31g is fixed to holding point 33G, the rigid of mounting part 21 can be improved.

Boss portion 31h is fixed to holding point 33H provided to a sand shakeout part having a high rigidity in cylinder head 2. That is, cylinder head 2 includes holding point 33H for fixing boss portion 31h in the sand shakeout part having a high rigidity. Consequently, in front cover 7, when boss portion 31h is fixed to holding point 33H, the rigid of mounting part 21 can be improved.

Then, the lower end of mounting part 21 which is positioned more on the crankshaft side (downward side) of internal combustion engine 1 than vehicle body attachment part 23 in the cylinder axial direction of internal combustion engine 1 is formed so as to be continued with boss portion 31e. Consequently, in front cover 7, when boss portion 31e is fixed to holding point 33E, the rigid of mounting part 21 can be improved.

In addition, as shown in FIG. 4, front cover 7 includes three load path portions 41 for load transmission which are continued in line shapes along the longitudinal direction of mounting part 21, and the rigid of load path portions 41 is reinforced. Load path portions 41 are parts in which the rigid is reinforced by increasing the thickness as compared with another part of mounting part 21. Load path portions 41 are made of a resin material such as a synthetic resin.

Load path portion 41a is a part forming the outer peripheral edge of mounting part 21, and is formed on the side of internal combustion engine 1 where auxiliary machines are attached. Load path portion 41a is formed such that the lower end of load path portion 41a positioned on the crankshaft side of internal combustion engine 1 in the cylinder axial direction of internal combustion engine 1 is superimposed onto crankshaft supporting part 36 of cylinder block 3. Load path portion 41a is formed with boss portions 31a to 31e. The position of the upper end of load path portion 41a substantially corresponds to the upper end of mounting part 21 positioned on the cylinder head side in the cylinder axial direction of internal combustion engine 1. In addition, load path portion 41a is formed with, at the lower end of load path portion 41a positioned on the crankshaft side of internal combustion engine 1 in the cylinder axial direction of internal combustion engine 1, boss portion 31e.

Load path portion 41b is a part of vertical rib 27 formed in the middle of mounting part 21. The position of the upper end of load path portion 41b substantially corresponds to the upper end of mounting part 21 positioned on the cylinder head side in the cylinder axial direction of internal combustion engine 1. In addition, the lower end of load path portion 41b positioned on the crankshaft side of internal combustion engine 1 in the cylinder axial direction of internal combustion engine 1 is connected to load path portion 41a. Load path portion 41b is formed with boss portion 31f.

Load path portion 41c is formed of lateral rib 28 and a part of the outer peripheral edge of mounting part 21 on the side of internal combustion engine 1 where auxiliary machines are not attached. The position of the upper end of load path portion 41c substantially corresponds to the upper end of mounting part 21 positioned on the cylinder head side in the cylinder axial direction of internal combustion engine 1. In addition, the lower end of load path portion 41c positioned on the crankshaft side of internal combustion engine 1 in the cylinder axial direction of internal combustion engine 1 is connected to load path portion 41b. Load path portion 41c is formed with boss portions 31g and 31h.

That is, boss portions 31 of front cover 7 are formed in load path portions 41. In addition, load path portions 41 are formed such that the lower ends of load path portions 41 are superimposed onto crankshaft supporting part 36 of cylinder block 3 at the time when front cover 7 is attached to cylinder block 3.

Therefore, in internal combustion engine 1, the load input from vehicle body attachment part 23 to mounting part 21 can be received by crankshaft supporting part 36 of cylinder block 3 which has a high rigidity via load path portions 41.

Mounting part 21 having vehicle body attachment part 23 made of a resin material for attaching internal combustion engine 1 to the vehicle body is formed integrally with front cover 7 mentioned in the embodiment. Therefore, as compared with a case where internal combustion engine 1 is fixed to the vehicle body side by using an iron mount bracket separate from the front cover, the weight and number of components of internal combustion engine 1 can be reduced.

In mounting part 21, since the outer shape (outer shape S) from vehicle body attachment part 23 to the lower end of mounting part 21 along the longitudinal direction of mounting part 21 is gently continued at a predetermined curvature, stress is hard to be generated. Therefore, it becomes possible to receive, by the whole of mounting part 21, the load input from vehicle body attachment part 23, and thereby the rigidity can be improved.

In addition, since the cross section change rate of mounting part 21 becomes small as it goes from vehicle body attachment part 23 to the lower end of mounting part 21, stress is also hard to be generated. Therefore, it also becomes possible to receive, by the whole of mounting part 21, the load input from vehicle body attachment part 23, and thereby the rigidity can be improved.

In front cover 7, load path portions 41 of which the rigid has been reinforced are formed with boss portions 31 provided at the outer peripheral edge of mounting part 21, and thereby, when boss portions 31 are fixed to holding points 33, the rigid of mounting part 21 can be improved.

In addition, in front cover 7, the lower ends of load path portions 41 of which the rigid has been reinforced are fixed to crankshaft supporting part 36 of cylinder block 3 which has a high rigidity, and thereby when boss portions 31 are fixed to holding points 33, the rigid of mounting part 21 can be also improved.

As the above, although a specific embodiment of the present invention has been explained, the present invention is not limited to the above embodiment, and various change can be carried out within a range not departing from the scope and spirit of the present invention. For example, the number of boss portions 31 and the number of load path portions 41 are not limited to the numbers in the embodiment mentioned above, and may be higher or lower than the numbers in the embodiment.

The invention claimed is:

1. An internal combustion engine comprising:
a front cover made of a resin which is disposed so as to cover end surfaces on one end sides of a cylinder block and a cylinder head in a crankshaft axial direction,
wherein a mounting part made of a resin material and configured for attaching the internal combustion engine to a vehicle body is formed integrally with the front cover,
wherein the mounting part protrudes to a forward side of the internal combustion engine,
wherein the front cover includes, at an outer peripheral edge of the mounting part, a plurality of boss portions, and by a plurality of the boss portions, the outer peripheral edge of the mounting part is fixed to the cylinder head and the cylinder block, and
wherein a length of the mounting part along a cylinder axial direction of the internal combustion engine is longer than a length of the mounting part along a width direction of the internal combustion engine.

2. The internal combustion engine according to claim 1, wherein the mounting part is formed in an elongated hollow shape along the cylinder axial direction of the internal combustion engine.

3. The internal combustion engine according to claim 2, wherein a vehicle body attachment part to be attached to the vehicle body is formed integrally with the mounting part,
wherein the vehicle body attachment part is formed on a cylinder head side of the mounting part in the cylinder axial direction of the internal combustion engine, and
wherein the mounting part is formed such that an outer shape of the mounting part from the vehicle body attachment part to a lower end of the mounting part along a longitudinal direction of the mounting part is continued at a predetermined curvature.

4. The internal combustion engine according to claim 2, wherein a vehicle body attachment part to be attached to the vehicle body is formed integrally with the mounting part,
wherein the vehicle body attachment part is formed on a cylinder head side of the mounting part in the cylinder axial direction of the internal combustion engine, and
wherein the mounting part is formed such that a cross section change rate of the mounting part becomes small as it goes from the vehicle body attachment part to a lower end of the mounting part which is positioned more on a crankshaft side of the internal combustion engine than the vehicle body attachment part in the cylinder axial direction of the internal combustion engine.

5. The internal combustion engine according to claim 1, wherein a vehicle body attachment part to be attached to the vehicle body is formed integrally with the mounting part, and
wherein a lower end of the mounting part which is positioned more on a crankshaft side of the internal combustion engine than the vehicle body attachment part in the cylinder axial direction of the internal combustion engine is formed so as to be continued with one of the boss portions.

6. The internal combustion engine according to claim 1, wherein the cylinder block includes a holding point for fixing one of the boss portions to a crankshaft supporting part for supporting a crankshaft of the internal combustion engine.

7. The internal combustion engine according to claim 1, wherein the cylinder block includes, at an outer peripheral edge on a side of the internal combustion engine where an auxiliary machine is attached, a holding point for fixing one of the boss portions, when viewed in the crankshaft axial direction.

8. The internal combustion engine according to claim 1, wherein the front cover includes a load path portion for load transmission which is continued along a longitudinal direction of the mounting part, and rigidity of the load path portion is reinforced, and
wherein the boss portions are formed in the load path portion.

9. The internal combustion engine according to claim 8, wherein a lower end of the load path portion which is positioned on a crankshaft side of the internal combustion engine in the cylinder axial direction of the internal combustion engine is fixed, by one of the boss portions, to a crankshaft supporting part of the cylinder block for supporting a crankshaft of the internal combustion engine.

10. The internal combustion engine according to claim 1, wherein a cam bracket for supporting a cam shaft of the internal combustion engine is included, and
wherein the cam bracket includes, at a one-end-side wall which faces the front cover, a holding point for fixing one of the boss portions.

11. The internal combustion engine according to claim 10, wherein the one-end-side wall includes, on a back side thereof, a protruding portion having a wedge shape in cross section, and
wherein the protruding portion is formed such that thickness of the protruding portion gradually increases toward a cylinder head side in the cylinder axial direction of the internal combustion engine.

* * * * *